United States Patent Office 3,006,838
Patented Oct. 31, 1961

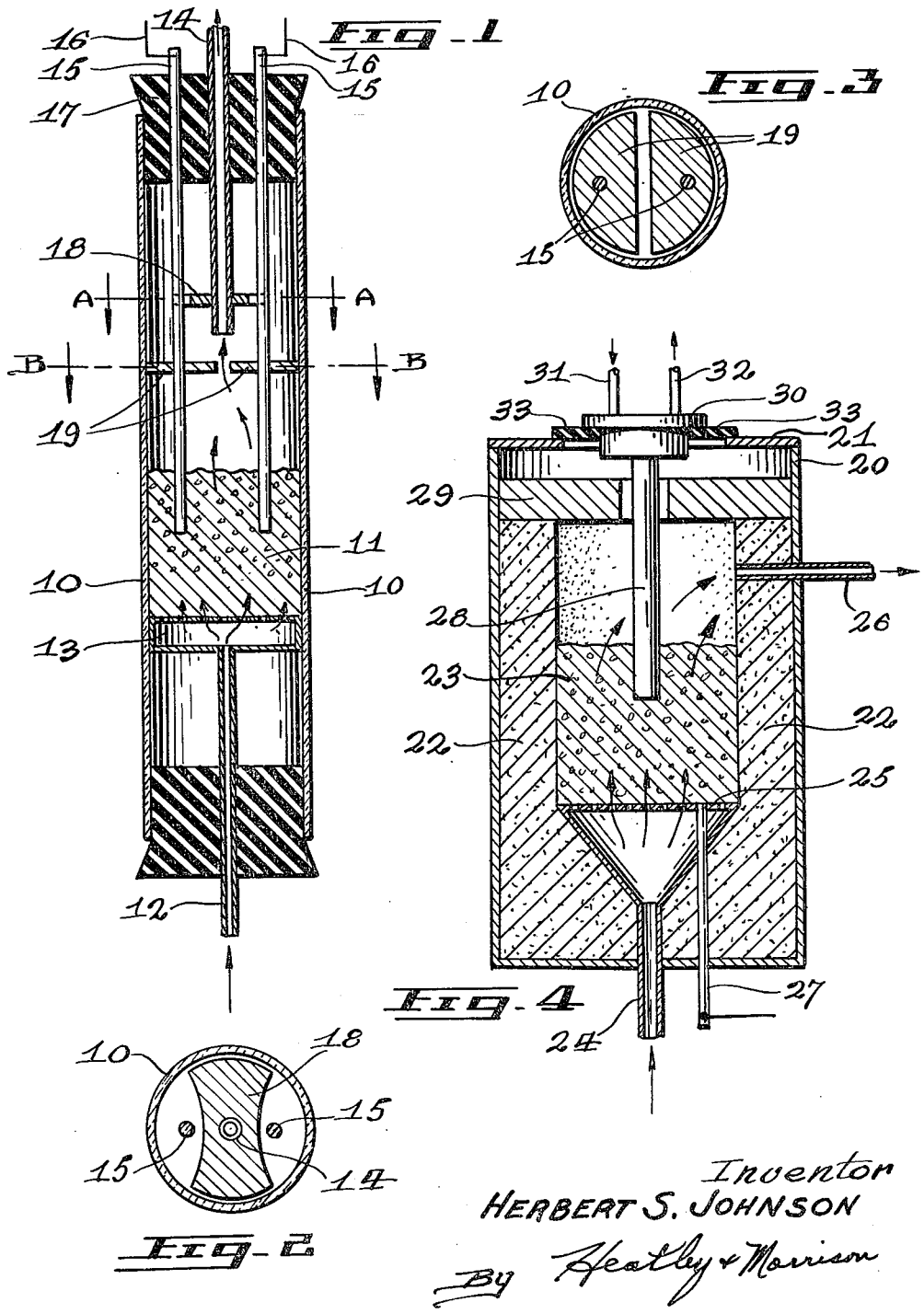

3,006,838
ELECTROTHERMIC FLUIDIZED BED APPARATUS
Herbert S. Johnson, Shawinigan South, Quebec, Canada, assignors to Shawinigan Chemicals Limited, Montreal, Quebec, Canada, a corporation of Canada
Filed Sept. 8, 1958, Ser. No. 759,769
2 Claims. (Cl. 204—312)

This invention relates to improvements in apparatus for obtaining high temperatures in a bed of fluidized electrically conductive particles heated by the passage of electric current through the fluidized bed. Apparatus such as this is described as early as 1932 by F. Winkler in U.S.P. 1,857,799. Winkler's apparatus consisted of a fluid bed reaction chamber with flat alloy plates as electrodes located in opposite walls of the reactor so that electric current flowing between the electrodes passed through the fluidized bed of carbon particles. The apparatus was designed for production of water gas from steam and granular coke made from lignite.

Serious difficulties have been encountered in the operation of fluidized beds heated electrically as described by Winkler and others, especially when attempts are made to raise the operating temperatures above about 900° C. Thus, although apparatus of the type described by Winkler has been known for over twenty-five years, and suggestions have been made for utilization of apparatus of this type as recently as in 1949 by P. W. Garbo for the reduction of zinc compounds to metallic zinc vapor (U.S.P. 2,475,607) and in 1957 by E. F. Pevere et al. for spark discharge activated chemical reactions (U.S.P. 2,799,640), no eminently satisfactory apparatus has been developed or described and no commercial apparatus is known to exist or to have been operated on a commercial scale.

The principal difficulty which has beset operation of electrically heated fluidized beds at elevated temperatures has been electrical failure which has ensued as the result of apparent breakdown, within or in the vicinity of the fluidized bed, of the electrical insulating properties of structural elements separating electrodes at different potentials. Such breakdowns have caused short circuits which have been known to melt ceramic structural elements retaining the electrodes and fluidized bed.

It is the object of this invention to provide improvements in apparatus for obtaining high temperatures in a fluidized bed of electrically conductive particles heated by the passage of electricity therethrough, whereby the apparatus can be operated continuously for prolonged periods at high temperatures, including temperatures above 1000° C., without failure of the electrical insulation isolating the electrodes carrying current to the fluidized bed.

This and other desirable objects are achieved by the present invention which comprises, in an apparatus for obtaining high temperatures in a fluidized bed of electrically conductive particles heated by the passage of electricity therethrough, comprising: (a) a reaction chamber enclosed by a heat insulating structure, to retain a bed of hot fluidized electrically conductive particles, (b) gas inlet means to admit and distribute fluidizing gas beneath the fluidized bed, (c) gas outlet means to conduct gases from above the fluidized bed to points outside the reaction chamber, (d) at least two electrodes at different electrode potentials contacting the bed of fluidized particles, conducting current to the bed, and (e) means connecting the electrodes to a source of power, the improvements which consist of (1) gas-tight electrical insulation around each electrode which enters the reaction chamber at a point above the level of the fluidized bed, with not more than one electrode function entering the reaction chamber below the level of the fluidized bed, said insulation surrounding its associated electrode at the point of entry to the heat-insulating structure and forming the only connection, other than the fluidized bed, between the electrode and the heat insulating structure, and (2) radiant-heat shielding between the said gas-tight electrical insulation and the top of the fluidized bed, to prevent radiant heat from the fluidized bed from impinging directly on said insulation. The expression "electrode function" is used herein to designate a single electrode or a group of directly connected electrodes at a single potential. A group of electrodes is used as an electrode function in lieu of a single electrode when it is desired to have a lower current density on the surface of the electrode function than can be obtained with a single electrode, and for other significant reasons.

In preferred forms of the invention, the parts of the electrodes which are in contact with the gas-tight electrical insulation are cooled by contact with suitable circulating cooling fluid.

The apparati to which this invention relates have a great deal in common with conventional electric furnaces. The apparati suggested by Winkler and by Garbo utilized electrodes all of which penetrated the walls of the structure retaining fluidized beds and entered the beds below the top surface thereof. It has been found that such an arrangement of electrodes is impracticable at high temperatures, e.g. above about 900° C., because continuous electrically conductive paths soon develop on the walls of the structures and form short circuits between the points where the electrodes penetrate the walls. These conductive paths have been observed to form apparently by a highly localized temporary melting of the surface of normally non-conductive walls and consequent incorporation of conductive solids into the matrix, forming a conductive surface.

Accordingly it has been found necessary, for practicable operation of fluidized beds at high temperatures, to locate the electrodes so that not more than one electrode function penetrates the walls of the structure and enters the fluidized bed below the top surface thereof. Thus, with two electrodes for a single phase electrically heated fluidized bed, both electrodes can be located to enter the fluidized bed from the top, or they can be located so that one electrode enters the fluidized bed through the top and the other enters the bed below the level of the top. With this latter arrangement, the lower electrode can conveniently be a conductive part of the structure retaining the fluidized bed and contacting it effectively during operation.

It has further been found necessary, for practicable operation of fluidized beds at high temperatures, that the electrical insulation, separating those electrodes which enter the fluidized bed through the top from the structure which forms the chamber enclosing the fluidized bed, be shielded from direct radiation from the fluidized bed by radiant-heat shielding. It has been ascertained that all well known electrically insulating materials become electrically conductive to an appreciable extent at temperatures frequently encountered in electrically heated fluidized beds. Furthermore, the structure enclosing the fluidized bed must be gas-tight to retain the fluidizing gases in their proper flow channels, hence the electrical insulation separating the electrodes from the structure must also be gas-tight. Thus gas-tight electrical insulation around each electrode which enters a fluidized bed through the top thereof must form the only connection, other than the fluidized bed, between the electrode and the structure enclosing the fluidized bed, and the insulation must be shielded from direct radiation of heat radiating from the fluidized bed.

The invention is illustrated in diagrammatic form by the accompanying drawings in which FIGURE 1 shows an electrically heated fluidized bed in vertical cross section, FIGURES 2 and 3 are horizontal cross sections of the apparatus of FIGURE 1 at A—A and B—B respectively, and FIGURE 4 shows another electrically heated fluidized bed in vertical cross section, both FIGURES 1 and 4 including details of the improvements constituting the invention.

In FIGURE 1, a laboratory scale fluid bed reactor apparatus is shown. It comprises a high temperature resistant glass cylinder 10 containing a bed of fluidized electrically conductive solids 11. Gas to fluidize the solids is admitted through inlet 12 and distributed beneath the bed by distributor 13. A gas outlet 14 conducts gases from the apparatus. Two electrodes 15, connected by leads 16 to a source of power (not shown), conduct current to the fluidized bed 11. The electrodes are separated and insulated from each other and from the main structure of the reactor by the electrically insulating rubber stopper 17. The rubber stopper 17 is shielded from direct radiation of heat from the fluidized bed by a central heat resistant shield 18 mounted on the gas outlet and two additional shields 19 mounted separately on the two electrodes respectively, said shields being out of contact with each other and other elements of the apparatus. Cooling by natural air convection is sufficient to cool the part of the reactor above the radiation shields.

In FIGURE 4, a large scale cylindrical fluid bed reactor apparatus is illustrated, partly in section. It comprises a steel shell 20 and cover 21 enclosing a heat insulating ceramic lining 22. The bed of fluidized solids 23 is fluidized by gas which enters through inlet 24 and is distributed under the bed by electrically conductive distributor 25. Gas leaves the apparatus through outlet 26. The gas distributor acts as one electrode of the apparatus, and receives current through the lead-in electrode 27. The top entering electrode 28 passes through a hole in the heat shielding baffle 29 which covers the top of the fluid bed chamber. The baffle 29 absorbs all the heat radiating up from the fluidized bed except that passing through the annular space between the electrode 28 and baffle 29. The heat passing through this gap strikes the head 30 of the electrode; this head can be cooled by circulating coolant flowing in and out at 31 and 32. The critical piece of electrical insulation is the insulating ring 33, which is protected from radiant heat of the fluidized bed by the baffle 29 and cooled electrode head 30. Thus the electrode 28 and electrode head 30, at one potential, are insulated from the rest of the apparatus at other potentials by insulation 33, which insulation is gas-tight and completely shielded from radiant heat from the fluidized bed.

Materials of construction are obviously highly important in the utilization of this invention. The surfaces of the apparatus in contact with, or exposed to direct radiation from, the hot fluidized bed will, unless effectively cooled, achieve temperatures substantially as high as that of the fluidized bed itself. Thus all parts of the apparatus so exposed must have effective high temperature resistance or must be effectively cooled. To conserve heat in the fluidized bed, it is obvious to use thermally insulating materials wherever possible to reduce heat losses from refractory materials to the surrounding medium. An excellent refractory construction material for use in conjunction with this invention is high alumina brick, which can readily be utilized for the vertical walls surrounding a hot fluidized bed. Numerous types of high alumina castable refractory, e.g. Alundum," are suitable materials for parts which must be exposed to the direct heat of a fluidized bed and which must be cast; for example the heat shielding cover 9 in FIGURE 2 can be cast in one or more pieces from such refractory material. Silicon carbide is also an excellent refractory material which can be used alone or in conjunction with cast refractory parts as a particularly effective refractory facing.

Because the parts of the apparatus which electrically insulate the electrodes from one another are shielded from the direct heat of the fluidized bed, according to present invention, the said electrically insulating parts need not have the high temperature resisting properties required of the exposed parts. This is effectively illustrated in the small scale apparatus depicted in FIGURE 1; units such as this have been successfully operated for many hours in the study of various chemical reactions in fluidized beds at high temperatures, e.g. over 1000° C. without destructive damage to the ordinary laboratory rubber stoppers acting as the electrical insulation only inches away from the hot fluidized beds. In larger scale apparatus, such as illustrated in FIGURE 4, critical electrically insulating parts made of "Transite" asbestos board have been found to be in perfect insulating condition after weeks of service in high temperature fluidized bed apparatus when shielded according to this invention, whereas unshielded "Transite" asbestos board parts have been found to deteriorate, crumble, and provide a matrix for electrical short circuits after a few days exposure to direct radiant heat from the fluidized beds.

The electrodes used in contact with hot fluidized beds are preferably made of graphite or other suitable conductive form of carbon. Such carbon electrodes combine adequate electrical conductivity with effective heat resistance not possessed by the metal alloy electrodes suggested for such applications in the prior art.

To permit cooling of the parts of the electrode in direct contact with the critical electrical insulation, it is expedient to provide means for circulating cooling fluid around or through such parts. Thus, as illustrated in FIGURE 4, a carbon electrode 28 can be fitted into a metal electrode head 30, and the head cooled by coolant circulating therethrough.

It will also be understood that additional modifications to those already mentioned may be made in the specific embodiments disclosed without departing from the spirit of the invention or the scope of the claims.

What is claimed is:

1. In an apparatus for obtaining high temperatures in a fluidized bed of electrically conductive particles heated by the passage of electricity therethrough, comprising: (a) a reaction chamber enclosed by a heat insulating structure, to retain a bed of hot fluidized electrically conductive particles in the lower portion of the chamber, (b) gas inlet means to admit and distribute fluidizing gas over the whole internal cross-section of the chamber at the bottom thereof, (c) gas outlet means to conduct gases from the upper portion of the chamber to points outside the chamber, (d) at least two electrodes at different potentials entering the chamber and terminating within the lower portion of the chamber, at least one of the said electrodes entering the upper portion of the chamber, and (e) means connecting the electrodes to a source of power, the improvements which consist of (1) gas-tight electrical insulation around each electrode which enters the upper portion of the chamber, said insulation surrounding its associated electrode at the point of entry to the heat-insulating structure and forming the only connection, other than the fluidized bed, between the electrode and the heat-insulating structure, and (2) radiant-heat shielding separated from the said insulation and positioned between the said insulation and the fluidized bed, said radiant-heat shielding being a heat-insulating baffle mounted near the top of the chamber, said baffle having an aperture larger than said electrode entering the upper portion of the chamber through which said electrode passes, the aperture being positioned in relation to the insulation and the electrode so that the radiation from the fluidized bed which passes through the aperture falls only on the electrode and not on the insulation, the said baffle occupying the whole cross-sectional area of the chamber except the aperture.

2. In an apparatus for obtaining high temperatures in a fluidized bed of electrically conductive particles heated by the passage of electricity therethrough, comprising: (a) a reaction chamber enclosed by a heat insulating structure, to retain a bed of hot fluidized electrically conductive particles in the lower portion of the chamber, (b) gas inlet means to admit and distribute fluidizing gas over the whole internal cross-section of the chamber at the bottom thereof, (c) gas outlet means to conduct gases from the upper portion of the chamber to points outside the chamber, (d) at least two electrodes at different potentials entering the chamber and terminating within the lower portion of the chamber, at least one of the said electrodes entering the upper portion of the chamber, and (e) means connecting the electrodes to a source of power, the improvements which consist of (1) gas-tight electrical insulation around each electrode which enters the upper portion of the chamber, said insulation surrounding its associated electrode at the point of entry to the heat-insulating structure and forming the only connection, other than the fluidized bed, between the electrode and the heat-insulating structure, each of said electrodes in contact with the electrical insulation being cooled by circulation of cooling fluid in contact therewith, and (2) radiant-heat shielding separated from the said insulation and positioned between the said insulation and the fluidized bed, said radiant-heat shielding being a heat-insulating baffle mounted near the top of the chamber, said baffle having an aperture larger than said electrode entering the upper portion of the chamber through which said electrode passes, the aperture being positioned in relation to the insulation and the cooled portion of the electrode so that the radiation from the fluidized bed which passes through the aperture falls only on the cooled portion of the electrode and not on the insulation, the said baffle occupying the whole cross-sectional area of the chamber except the aperture.

References Cited in the file of this patent

UNITED STATES PATENTS

| | | |
|---|---|---|
| 1,274,798 | Shoeld | Aug. 6, 1918 |
| 1,352,086 | Rose | Sept. 7, 1920 |
| 1,853,688 | Leffer | Apr. 12, 1932 |
| 1,857,799 | Winkler | May 10, 1932 |
| 2,799,640 | Pevere | July 16, 1957 |

FOREIGN PATENTS

| | | |
|---|---|---|
| 705,011 | Great Britain | Mar. 3, 1954 |